US008012583B2

(12) United States Patent
Wu

(10) Patent No.: US 8,012,583 B2
(45) Date of Patent: Sep. 6, 2011

(54) POLYANILINE SILANOL CONTAINING INTERMEDIATE TRANSFER MEMBERS

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 100 days.

(21) Appl. No.: 12/511,169

(22) Filed: Jul. 29, 2009

(65) Prior Publication Data

US 2011/0027589 A1 Feb. 3, 2011

(51) Int. Cl.
*B32B 5/66* (2006.01)

(52) U.S. Cl. ........ 428/403; 428/404; 428/405; 428/406; 428/407; 428/327; 428/473.5

(58) Field of Classification Search ............... 428/473.5, 428/327, 403–407
See application file for complete search history.

(56) References Cited

U.S. PATENT DOCUMENTS

| | | | | |
|---|---|---|---|---|
| 6,397,034 | B1 | 5/2002 | Tarnawskyj et al. | |
| 6,602,156 | B2 | 8/2003 | Schlueter, Jr. | |
| 7,031,647 | B2 * | 4/2006 | Mishra et al. | 399/302 |
| 7,130,569 | B2 * | 10/2006 | Goodman et al. | 399/302 |
| 7,139,519 | B2 | 11/2006 | Darcy, III et al. | |
| 7,280,791 | B2 * | 10/2007 | Goodman et al. | 399/302 |
| 7,618,758 | B2 * | 11/2009 | Wu et al. | 430/58.8 |
| 7,727,689 | B2 * | 6/2010 | Wu et al. | 430/58.2 |
| 7,781,132 | B2 * | 8/2010 | Yanus et al. | 430/58.2 |
| 7,799,497 | B2 * | 9/2010 | Yanus et al. | 430/67 |

OTHER PUBLICATIONS

Jin Wu et al, U.S. Appl. No. 12/511,160 entitled Fluoroelastomer Containing Intermediate Transfer Members, filed concurrently herewith.

Jin Wu et al, U.S. Appl. No. 12/511,183 entitled Polyhedral Silsesquioxane Modified Polyimide Containing Intermediate Transfer Members, filed concurrently herewith.

Jin Wu, U.S. Appl. No. 12/181,354 entitled Core Shell Intermediate Transfer Components, filed Jul. 29, 2008.

Jin Wu et al, U.S. Appl. No. 12/431,829 entitled Core Shell Hydrophobic Intermediate Transfer Components, filed Apr. 29, 2009.

* cited by examiner

*Primary Examiner* — Leszek Kiliman
(74) *Attorney, Agent, or Firm* — Oliff & Berridge, PLC

(57) ABSTRACT

An intermediate transfer member that includes a core shell component where the core is, for example, a polyaniline, and the shell is a polyhedral silsesquioxane.

29 Claims, No Drawings

POLYANILINE SILANOL CONTAINING INTERMEDIATE TRANSFER MEMBERS

CROSS REFERENCE TO RELATED APPLICATIONS

Illustrated in U.S. application Ser. No. 12/511,160 on Fluoroelastomer Containing Intermediate Transfer Members, filed Jul. 29, 2009, the disclosure of which is totally incorporated herein by reference, is an intermediate transfer member comprised of a core shell component dispersed in a fluoroelastomer, and wherein the core is comprised of a metal oxide and the shell is comprised of silica.

Illustrated in U.S. application Ser. No. 12/511,183 on, filed Jul. 29, 2009, the disclosure of which is totally incorporated herein by reference, is an intermediate transfer member comprised of a polyhedral silsesquioxane modified polyimide, and wherein said silsesquioxane is attached to said polyimide.

Illustrated in U.S. application Ser. No. 12/181,354, U.S. Publication 20100028700 on Core Shell Intermediate Transfer Components, filed Jul. 29, 2008, the disclosure of which is totally incorporated herein by reference, is an intermediate transfer belt comprised of a substrate comprising a conductive core shell component.

Illustrated in U.S. application Ser. No. 12/431,829, U.S. Publication 20100279094 on Core Shell Hydrophobic Intermediate Transfer Components, filed Apr. 29, 2009, the disclosure of which is totally incorporated herein by reference, an intermediate transfer belt comprised of a substrate comprising a core shell component and wherein the core is comprised of a metal oxide and the shell is comprised of silica.

BACKGROUND

Disclosed are intermediate transfer members, and more specifically, intermediate transfer members useful in transferring a developed image in an electrostatographic, for example xerographic, including digital, image on image, and the like, printers, machines or apparatuses. In embodiments, there are selected intermediate transfer members comprised of a core shell component comprised of a polyaniline core and a POSS silanol core, where POSS is polyhedral oligomeric silsesquioxane, such as POSS, $RSiO_{1.5}$, where R is an alkyl with, for example, from about 1 to about 18 carbon atoms, or from about 4 to about 8 carbon atoms; aryl with, for example, from about 6 to about 32 carbon atoms, or from about 6 to about 24 carbon atoms; and which members have a number of advantages such as stable resistivity, hydrophobic characteristics, excellent dimensional stability, excellent image transfer properties and acceptable mechanical properties such as scratch resistance.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant, which are commonly referred to as toner. Generally, the electrostatic latent image is developed by bringing a developer mixture into contact therewith. The developer mixture can comprise a dry developer mixture, which usually comprises carrier granules having toner particles adhering triboelectrically thereto, or a liquid developer material, which may include a liquid carrier having toner particles, dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently transfer with a high transfer efficiency the developed image from the intermediate transfer member to a permanent substrate. The toner image is subsequently usually fixed or fused upon a support, which may be the photosensitive member itself, or other support such as plain paper.

In electrostatographic printing machines, wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially 100 percent toner transfer occurs when most or all of the toner particles comprising the image are transferred, and little residual toner remains on the surface from which the image was transferred.

A disadvantage of using an intermediate transfer member is that a plurality of transfer steps is usually needed allowing for the possibility of charge exchange occurring between toner particles and the transfer member which ultimately can lead to less than complete toner transfer. This results in low resolution images on the image receiving substrate and also image deterioration. When the image is in color, the image can additionally suffer from color shifting and color deterioration with a number of transfer stops.

In embodiments, the resistivity of the intermediate transfer member is within a range to allow for sufficient transfer. It is also desired that the intermediate transfer member have a controlled resistivity, wherein the resistivity is virtually unaffected by changes in humidity, temperature, bias field, and operating time. In addition, a controlled resistivity is of value so that a bias field can be established for electrostatic transfer. Also, it is of value that the intermediate transfer member not be too conductive as air breakdown can possibly occur.

In U.S. Pat. No. 6,397,034, there is disclosed the use of a fluorinated carbon filler in a polyimide intermediate transfer member layer. However, there are disadvantages associated with these members, such as undissolved particles frequently bloom or migrate to the surface of the polymer layer which leads to nonuniform resistivity characteristics, which in turn causes poor antistatic properties and poor mechanical strength. Also, the ionic additives present on the surface of the member in, for example, a belt form may interfere with toner release, and bubbles may appear in the conductive polymer layer, some of which can only be seen with the aid of a microscope, others of which are large enough to be observed with the naked eye, resulting in poor or nonuniform electrical properties and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 to 80 percent relative humidity when ionic additives are present. This effect limits the operational or process latitude of the intermediate transfer member.

Therefore, it is desired to provide an intermediate transfer member with a number of the advantages illustrated herein, and weldable intermediate transfer belts, which have excellent transfer ability. It is also desired to provide a weldable intermediate transfer belt that may not have puzzle cut seams, but instead has a weldable seam, thereby providing a belt that can be manufactured without labor intensive steps such as manually piecing together the puzzle cut seam with one's fingers, and without the lengthy high temperature and high humidity conditioning steps. It is also desired to provide an acceptable circumference weldable belt for color xerographic machines, inclusive of solid ink printers.

REFERENCES

Illustrated in U.S. Pat. No. 7,130,569 is a weldable intermediate transfer belt comprising a substrate comprising a homogeneous composition comprising a polyaniline in an amount of from about 2 to about 25 percent by weight of total solids, and a thermoplastic polyimide present in an amount of from about 75 to about 98 percent by weight of total solids, wherein the polyaniline has a particle size of from about 0.5 to about 5 microns.

Also referenced are U.S. Pat. No. 7,031,647, the disclosure of which is totally incorporated herein by reference, which illustrates an intermediate transfer belt, comprising a belt substrate comprising primarily at least one polyimide polymer; and a welded seam; and U.S. Pat. No. 7,139,519, which illustrates an image forming apparatus for forming images on a recording medium comprising:

a charge-retentive surface to receive an electrostatic latent image thereon;

a development component to apply toner to the charge-retentive surface to develop the electrostatic latent image to form a developed toner image on the charge retentive surface;

an intermediate transfer member to transfer the developed toner image from the charge retentive surface to a copy substrate, wherein the intermediate transfer member comprises a substrate comprising a first binder and lignin sulfonic acid doped polyaniline dispersion; and a fixing component to fuse the developed toner image to the copy substrate.

In U.S. Pat. No. 7,280,791, the disclosure of which is totally incorporated herein by reference, there is illustrated a weldable intermediate transfer belt comprising a substrate comprising a homogeneous composition comprising polyaniline in an amount of from about 2 to about 25 percent by weight of total solids, and thermoplastic polyimide in an amount of from about 75 to about 98 percent by weight of total solids, wherein the polyaniline has a particle size of from about 0.5 to about 5 microns.

U.S. Pat. No. 6,602,156 discloses, for example, a polyaniline filled polyimide puzzle cut seamed belt. The manufacture of a puzzle cut seamed belt is labor intensive and costly, and the puzzle cut seam, in embodiments, is sometimes weak. The manufacturing process for a puzzle cut seamed belt usually requires a lengthy high temperature and high humidity conditioning step.

SUMMARY

Included within the scope of the present disclosure is an intermediate transfer belt, and intermediate members other than belts comprised of a substrate comprising a core shell component, and more specifically, a polyaniline core and a polyhedral oligomeric silsesquioxane (POSS, $RSiO_{1.5}$) shell, where R is alkyl with, for example, from about 1 to about 18 carbon atoms, or from about 4 to about 8 carbon atoms; aryl with, for example, from about 6 to about 32 carbon atoms, from about 6 to about 24 carbon atoms, from 6 to 18 carbon atoms, or from 6 to 12 carbon atoms. The core shell component is formed in embodiments by mixing a polyaniline with a functional POSS, such as a POSS silanol, in a solvent, and where an acid base neutralization reaction results.

Examples of the polyanilines selected for the core include a number of polyanilines as illustrated herein, such as PANIPOL® F, commercially available from Panipol Oy, Finland, and where a specific polyaniline possesses, for example, a relatively small particle diameter size of, for example, from about 0.5 to about 5 microns, from about 1.1 to about 2.3 microns, from about 1.2 to about 2 microns, from about 1.5 to about 1.9 microns, or about 1.7 microns.

Typical examples of the POSS silanol can be represented by

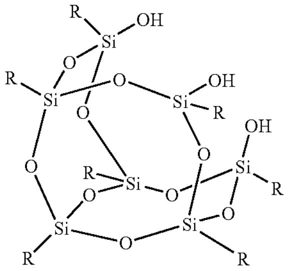

where each R is alkyl, aryl, or mixtures thereof, and more specifically, where R is isooctyl, isobutyl, or phenyl.

In embodiments, examples of the POSS silanol that is reacted with the polyaniline include isobutyl-POSS cyclohexenyldimethylsilyldisilanol or isobutyl-polyhedral oligomeric silsesquioxane cyclohexenyldimethylsilyldisilanol ($C_{38}H_{84}O_{12}Si_8$), cyclopentyl-POSS dimethylphenyldisilanol ($C_{43}H_{76}O_{12}Si_8$), cyclohexyl-POSS dimethylvinyldisilanol ($C_{46}H_{88}O_{12}Si_8$), cyclopentyl-POSS dimethylvinyldisilanol ($C_{39}H_{74}O_{12}Si_8$), isobutyl-POSS dimethylvinyldisilanol ($C_{32}H_{74}O_{12}Si_8$), cyclopentyl-POSS disilanol ($C_{40}H_{74}O_{13}Si_8$), isobutyl-POSS disilanol ($C_{32}H_{74}O_{13}Si_8$), isobutyl-POSS epoxycyclohexyldisilanol ($C_{38}H_{84}O_{13}Si_8$), cyclopentyl-POSS fluoro(3)disilanol ($C_{40}H_{75}F_3O_{12}Si_8$), cyclopentyl-POSS fluoro(13)disilanol ($C_{45}H_{75}F_{13}O_{12}Si_8$), isobutyl-POSS fluoro(13)disilanol ($C_{38}H_{75}F_{13}O_{12}Si_8$), cyclohexyl-POSS methacryldisilanol ($C_{51}H_{96}O_{14}Si_8$), cyclopentyl-POSS methacryldisilanol ($C_{44}H_{82}O_{14}Si_8$), isobutyl-POSS methacryldisilanol ($C_{37}H_{82}O_{14}Si_8$), cyclohexyl-POSS monosilanol ($C_{42}H_{78}O_{13}Si_8$), cyclopentyl-POSS monosilanol (Schwabinol, $C_{35}H_{64}O_{13}Si_8$), isobutyl-POSS monosilanol ($C_{28}H_{64}O_{13}Si_8$), cyclohexyl-POSS norbornenylethyldisilanol ($C_{53}H_{98}O_{12}Si_8$), cyclopentyl-POSS norbornenylethyldisilanol ($C_{46}H_{84}O_{12}Si_8$), isobutyl-POSS norbornenylethyldisilanol ($C_{39}H_{84}O_{12}Si_8$), cyclohexyl-POSS TMS disilanol ($C_{45}H_{88}O_{12}Si_8$), isobutyl-POSS TMS disilanol ($C_{31}H_{74}O_{12}Si_8$), cyclohexyl-POSS trisilanol ($C_{42}H_{80}O_{12}Si_7$), cyclopentyl-POSS trisilanol ($C_{35}H_{66}O_{12}Si_7$), isobutyl-POSS trisilanol ($C_{28}H_{66}O_{12}Si_7$), isooctyl-POSS trisilanol ($C_{56}H_{122}O_{12}Si_7$), phenyl-POSS trisilanol ($C_{42}H_{38}O_{12}Si_7$), and the like, all believed to be commercially available from Hybrid Plastics, Fountain Valley, Calif.

EMBODIMENTS

In aspects thereof there is disclosed an intermediate transfer member, such as a belt comprised of a core shell component, and wherein the core is comprised of a polyaniline, and the shell is comprised of polyhedral silsesquioxane where, in embodiments, the core shell component possesses a particle size of, for example, from about 0.5 to about 5 microns, from about 1 to about 3 microns, or from about 1.5 to about 2.5 microns; a hydrophobic intermediate transfer media comprised of a polyaniline core, and a shell generated from isobutyl-POSS cyclohexenyldimethylsilyldisilanol or isobutyl-polyhedral oligomeric silsesquioxane cyclohexenyldimethylsilyldisilanol ($C_{38}H_{84}O_{12}Si_8$), cyclopentyl-POSS dimethylphenyldisilanol ($C_{43}H_{76}O_{12}Si_8$), cyclohexyl-POSS dimethylvinyldisilanol ($C_{46}H_{88}O_{12}Si_8$), cyclopentyl-POSS dimethylvinyldisilanol ($C_{39}H_{74}O_{12}Si_8$), isobutyl-POSS dimethylvinyldisilanol ($C_{32}H_{74}O_{12}Si_8$), cyclopentyl-POSS disilanol ($C_{40}H_{74}O_{13}Si_8$), isobutyl-POSS disilanol ($C_{32}H_{74}O_{13}Si_8$), isobutyl-POSS epoxycyclohexyldisilanol ($C_{38}H_{84}O_{13}Si_8$), cyclopentyl-POSS fluoro(3)disilanol ($C_{40}H_{75}F_3O_{12}Si_8$), cyclopentyl-POSS fluoro(13)disilanol ($C_{45}H_{75}F_{13}O_{12}Si_8$), isobutyl-POSS fluoro(13)disilanol ($C_{38}H_{75}F_{13}O_{12}Si_8$), cyclohexyl-POSS methacryldisilanol ($C_{51}H_{96}O_{14}Si_8$), cyclopentyl-POSS methacryldisilanol ($C_{44}H_{82}O_{14}Si_8$), isobutyl-POSS methacryldisilanol ($C_{37}H_{82}O_{14}Si_8$), cyclohexyl-POSS monosilanol ($C_{42}H_{78}O_{13}Si_8$), cyclopentyl-POSS monosilanol (Schwabinol, $C_{35}H_{64}O_{13}Si_8$), isobutyl-POSS monosilanol ($C_{28}H_{64}O_{13}Si_8$), cyclohexyl-POSS norbornenylethyldisilanol ($C_{53}H_{98}O_{12}Si_8$), cyclopentyl-POSS norbornenylethyldisilanol ($C_{46}H_{84}O_{12}Si_8$), isobutyl-POSS norbornenylethyldisilanol ($C_{39}H_{84}O_{12}Si_8$), cyclohexyl-POSS TMS disilanol ($C_{45}H_{88}O_{12}Si_8$), isobutyl-POSS TMS disilanol ($C_{31}H_{74}O_{12}Si_8$), cyclohexyl-POSS trisilanol ($C_{42}H_{80}O_{12}Si_7$), cyclopentyl-POSS trisilanol ($C_{35}H_{66}O_{12}Si_7$), isobutyl-POSS trisilanol ($C_{28}H_{66}O_{12}Si_7$), isooctyl-POSS trisilanol ($C_{56}H_{122}O_{12}Si_7$), or phenyl-POSS trisilanol ($C_{42}H_{38}O_{12}Si_7$), mixtures thereof, and wherein POSS is, for example, a polyhedral silsesquioxane represented by POSS $RSiO_{1.5}$, where R is at least one of alkyl with from about 1 to about 18 carbon atoms, and aryl with from about 6 to about 32 carbon atoms; an intermediate transfer belt comprised of a supporting substrate and a coating of a core shell component comprised of a polyaniline core and thereover polyhedral silsesquioxane, and wherein the core is present in an amount of from about 45 to about 99 weight percent, and the shell is present in an amount of from about 1 weight percent to about 55 weight percent; an intermediate transfer member, such as a belt, that further includes an adhesive layer situated between a first supporting substrate layer and a second core shell layer as illustrated herein, and wherein at least one of the first layer and the second layer further contains a known conductive component like carbon black, a polyaniline, a metal oxide, and the like; an intermediate transfer belt comprised of a polyimide substrate layer, and thereover a layer comprised of the core shell component illustrated herein, and an apparatus for forming images on a recording medium comprising a charge retentive surface to receive an electrostatic latent image thereon;

a development component to apply toner to the charge retentive surface to develop the electrostatic latent image, and to form a developed image on the charge retentive surface; and an intermediate transfer belt to transfer the developed image from the charge retentive surface to a substrate, wherein the intermediate transfer belt comprises a the core shell illustrated herein.

The core shell filler is present in an amount of from about 3 to about 60 weight percent, from about 1 to about 50 weight percent, or from about 10 to about 30 weight percent based on the intermediate transfer member components.

In embodiments, the core shell component can be formed by mixing a polyaniline and a POSS silanol in a solvent, and the solid collected is then dispersed in a polymer selected from, for example, the group consisting of a polyimide, a polycarbonate, a polyamideimide, a polyphenylene sulfide, a polyamide, a polysulfone, a polyetherimide, a polyester or a polyester copolymer, a polyvinylidene fluoride (PVDF), a polyethylene-co-polytetrafluoroethylene, and the like, and mixtures thereof to form an intermediate member coating dispersion.

In another embodiment, an intermediate member coating dispersion can be prepared by mixing or milling a polyaniline, a POSS silanol, and a polymer, such as a polyimide, a polycarbonate, a polyamideimide, a polyphenylene sulfide, a polyamide, a polysulfone, a polyetherimide, a polyester or a polyester copolymer, a polyvinylidene fluoride (PVDF), a polyethylene-co-polytetrafluoroethylene, and mixtures thereof, in a solvent; examples of the solvent selected to form the dispersion include methylene chloride, tetrahydrofuran, ethanol, acetone, ethyl acetate, chloroform, hexane, and the like where the solvent is selected, for example, in an amount of from about 50 to about 95, and from 70 to about 90 weight percent based on the amounts in the reaction mixture. Subsequent to the completion of the acid base neutralization reaction, the polyaniline POSS core shell component results, and by known processes, such as filtration, the solvent is removed. Thus, in embodiments of the present disclosure, the reaction of a POSS silanol and a polyaniline forms a chemical bond, and more specifically, an ionic bond between the polyaniline and the POSS moiety that is free of functional groups such as alcohols, silanols, epoxies, and the like.

Yet in another embodiment, the core shell product component of the present disclosure is formed into a dispersion, which with moderate mechanical stirring, uniform dispersions can be obtained, and then coated on a substrate, such as a polyimide substrate using known draw bar coating methods. The resulting films can be dried by heating at temperatures, such as from about 100° C. to about 400° C. for about 20 to about 600 minutes while remaining on the polyimide substrate. After drying and cooling to room temperature, the about 1 to about 150 microns thick films formed on the substrate enable functional intermediate transfer members.

The core shell component can be readily synthesized by mixing a POSS silanol with a polyaniline (PANI) in a solvent. The acidic POSS silanol attaches to the basic PANI surface by an acid/base interaction, or the core shell component can be in situ formed with a dispersion by mixing/milling a POSS silanol, PANI, a polymer, and a solvent. More specifically, about 1 part of a polyaniline was mixed with 10.8 parts of a polycarbonate/copolyester resin blend, 0.2 part of a POSS silanol, and 150 parts of methylene chloride. By ball milling this mixture with 2 millimeter stainless shot overnight, or 23 hours, at a temperature of from about 20° C. to about 40° C., a uniform dispersion was obtained, and the polyaniline POSS core shell component was in situ formed, as illustrated by

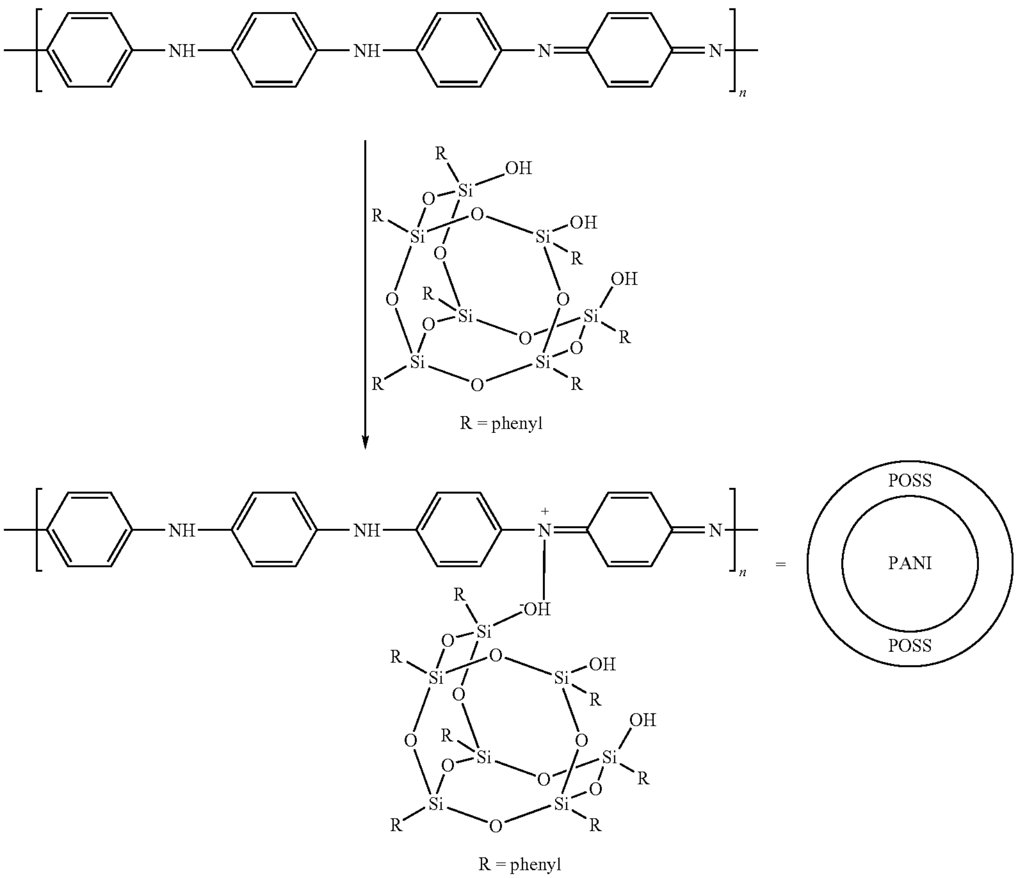

wherein n for the polyaniline represents the number of repeating segments, such as from 1 to about 200, from about 10 to about 100, and the like, and R is as illustrated herein; and wherein said core shell component is present in an amount of from about 1 to about 70 percent by weight based on the weight of total solids, or wherein said core shell component is present in an amount of from about 5 to about 20 percent by weight based on the weight of total solids.

The POSS shell is present in an amount of from about 1 to about 40 weight percent, or from about 5 to about 20 weight percent of the core shell component. The polyaniline core is present, for example, in an amount of from about 60 to about 99 weight percent, or from about 80 to about 95 weight percent of the core shell component. In embodiments, there are included additional components in the core shell such as a polymer as illustrated herein.

More specifically, examples of additional components present in the intermediate transfer member are a number of known polymers and conductive components.

Examples of polymeric binders that, in embodiments, may be included in the intermediate transfer member, and more specifically, the core shell, are polyimides (thermosetting or thermoplastic), polycarbonates, polyesters such as poly(ethylene terephthalate) (PET), poly(ethylene naphthalate) (PEN) and poly(butylene terephthalate) (PBT), polypolyvinylidene fluoride (PVDF), polyethylene-co-polytetrafluoroethylene, polyamideimide, polyphenylene sulfide, polyamide, polysulfone, polyetherimide, polyester copolymer, rapidly cured polyimide polymers, such as VTEC™ PI 1388, 080-051, 851, 302, 203, 201 and PETI-5, all available from Richard Blaine International, Incorporated, Reading, Pa. The thermosetting polyimides which can be cured at suitable temperatures, and more specifically, from about 180° C. to about 260° C. over a period of time, such as, for example, from about 10 to about 120 minutes, and from about 20 to about 60 minutes, possess, for example, a number average molecular weight of from about 5,000 to about 500,000, or from about 10,000 to about 100,000, and a weight average molecular weight of from about 50,000 to about 5,000,000, or from about 100,000 to about 1,000,000, the thermosetting polyimide precursors that are cured at higher temperatures (above 300° C.) than the VTEC™ PI polyimide precursors, and which precursors include, for example, PYRE-M.L® RC-5019. RC-5057, RC-5069, RC-5097, RC-5053 and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, commercially available from E.I. DuPont, Wilmington, Del., are present in amounts of, for example, of from about 70 to about 97, or from about 80 to about 95 weight percent of the intermediate transfer member.

Examples of specific selected thermoplastic polyimides included in the intermediate transfer member, especially the core shell thereof, are KAPTON® KJ, commercially available from E.I. DuPont, Wilmington, Del., as represented by

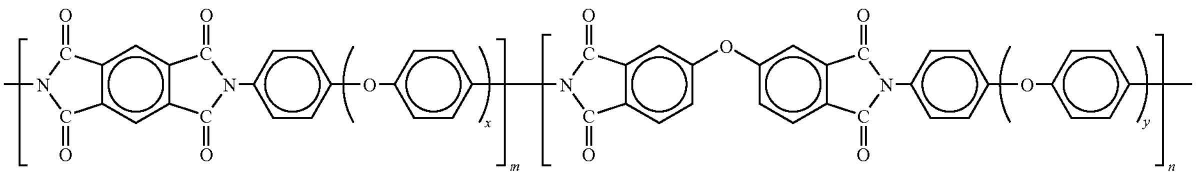

wherein x is equal to 2; y is equal to 2; m and n are from about 10 to about 300; and IMIDEX®, commercially available from West Lake Plastic Company, as represented by

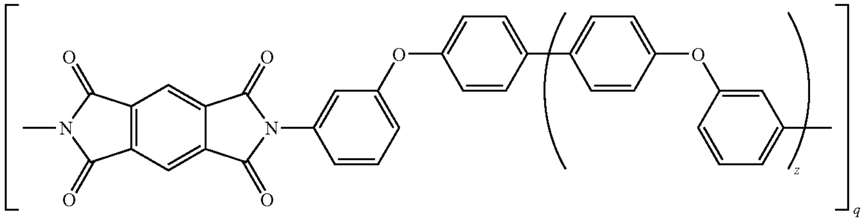

wherein z is equal to 1, and q is from about 10 to about 300.

Examples of polycarbonate binders selected include poly (4,4'-isopropylidene-diphenylene)carbonate (also referred to as bisphenol-A-polycarbonate), poly(4,4'-cyclohexylidine diphenylene)carbonate (also referred to as bisphenol-Z-polycarbonate), poly(4,4'-isopropylidene-3,3'-dimethyl-diphenyl)carbonate (also referred to as bisphenol-C-polycarbonate), and the like. In embodiments, the intermediate transfer member binders are comprised of bisphenol-A-polycarbonate resins, commercially available as MAKROLON®, with a weight average molecular weight of from about 50,000 to about 500,000.

Polyimides, which can be selected as the supporting substrate upon which is coated, or deposited the core shell illustrated herein, may be synthesized from prepolymer solutions, such as polyamic acid or esters of polyamic acid, or by the reaction of a dianhydride and a diamine. Suitable dianhydrides include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl) hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl)sulfide dianhydride, di-(3,4-dicarboxyphenyl)methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis (3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy) diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis(4-phenyleneoxy-4-phthalic acid)dianhydride, hexafluoroisopropyl idenebis(4-phenyleneoxy-4-phthalic acid)dianhydride, and the like. Exemplary diamines suitable for use in the preparation of the polyimide include aromatic diamines such as 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3,-bis-(gamma-aminopropyl)-tetramethyl-disiloxane, 1,6-diaminohexane, 4,4'-diaminodiphenylmethane, 3,3'-diaminodiphenylmethane, 1,3,-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluorobiphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]sulfone, bis [4-(3-aminophenoxy)phenyl]ketone, 4,4'-bis(3-aminophenoxy)biphenyl, 2,2-bis[4-(3-aminophenoxy) phenyl]propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane.

The dianhydrides and diamines are, for example, selected in a weight ratio of dianhydride to diamine of from about 20:80 to about 80:20, and more specifically, about a 50:50 weight ratio. The above aromatic dianhydride, such as an aromatic tetracarboxylic acid dianhydride, and diamine, such as an aromatic diamine, are used singly or as a mixture, respectively. The polyimide can be prepared from the dianhydride and diamine by known methods. For example, the dianhydride and the diamine can be suspended or dissolved in an organic solvent as a mixture or separately, and can be reacted to form the polyamic acid, which is thermally or chemically dehydrated, followed by separating and purifying the product. The polyimide is then heat melted with a known extruder, delivered in the form of a film from a die having a slit nozzle; a static charge is applied to the film, and the film is cooled and solidified with a cooling roller having a surface temperature in the range of the glass transition temperature ($T_g$) of the polymer [($T_g$)−50° C. to ($T_g$)−15° C.[; transmitted under tension without bringing the film into contact with the rollers while further cooling to room temperature, and wound up or transferred to a further step.

Examples of additional components, present in the intermediate transfer member include a number of known conductive components each present in an amount of from about 1 to about 60 weight percent, from 10 to about 50 weight percent, from 5 to about 45 weight percent such as a metal oxide, a polyaniline and a carbon black.

Examples of the metal oxides selected include titanium oxide, zinc oxide, tin oxide, aluminum doped zinc oxide, antimony doped titanium dioxide, antimony doped tin oxide, indium oxide, indium tin oxide, similar doped oxides, and mixtures thereof.

Carbon black additives selected include those with surface groups formed by the oxidation with an acid or with ozone, and where there are absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is dependent on surface area and its structure primarily. Generally, the higher the surface area and the higher the structure, the more conductive the carbon black. Surface area is measured by the B.E.T. nitrogen surface area per unit weight of carbon black, and is the measurement of the primary particle size. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 $m^2$/g, DBP absorption=1.05 ml/g), BLACK PEARLS® 880 (B.E.T. surface area=240 $m^2$/g , DBP absorption=1.06 ml/g), BLACK PEARLS® 800 (B.E.T. surface area=230 $m^2$/g, DBP absorption=0.68 ml/g), BLACK PEARLS® L (B.E.T. surface area=138 $m^2$/g, DBP absorption=0.61 ml/g), BLACK PEARLS® 570 (B.E.T. surface area=110 $m^2$/g, DBP absorption=1.14 ml/g), BLACK PEARLS® 170 (B.E.T. surface area=35 $m^2$/g, DBP absorption=1.22 ml/g), VULCAN® XC72 (B.E.T. surface area=254 $m^2$/g, DBP absorption=1.76 ml/g), VULCAN ® XC72R (fluffy form of VULCAN® XC72), VULCAN® XC605, VULCAN® XC305, REGAL® 660 (B.E.T. surface area=112 $m^2$/g, DBP absorption=0.59 ml/g), REGAL® 400 (B.E.T. surface area=96 $m^2$/g, DBP absorption=0.69 ml/g), REGAL® 330 (B.E.T. surface area=94 $m^2$/g, DBP absorption=0.71 ml/g), MONARCH® 880 (B.E.T. surface area=220 $m^2$/g, DBP absorption=1.05 ml/g, primary particle diameter=16 nanometers), and MONARCH® 1000 (B.E.T. surface area=343 $m^2$/g, DBP absorption=1.05 ml/g, primary particle diameter=16 nanometers); Channel carbon blacks available from Evonik-Degussa; Special Black 4 (B.E.T. surface area=180 $m^2$/g, DBP absorption=1.8 ml/g, primary particle diameter=25 nanometers), Special Black 5 (B.E.T. surface area=240 $m^2$/g, DBP absorption=1.41 ml/g, primary particle diameter=20 nanometers), Color Black FW1 (B.E.T. surface area=320 $m^2$/g, DBP absorption=2.89 ml/g, primary particle diameter=13 nanometers), Color Black FW2 (B.E.T. surface area=460 $m^2$/g, DBP absorption=4.82 ml/g, primary particle diameter=13 nanometers), and Color Black FW200 (B.E.T. surface area=460 $m^2$/g, DBP absorption=4.6 ml/g, primary particle diameter=13 nanometers), mixtures thereof, and the like.

Adhesive layer components selected for the plural layered members, and which adhesive layer is usually situated between the supporting substrate and the top core shell layer illustrated herein include, for example, a number of resins or polymers of epoxy, urethane, silicone, polyester, and the like. Generally, the adhesive layer is a solventless layer that is a material that is a liquid at room temperature (about 25° C.) and crosslink to an elastic or rigid film permitting at least two materials to adhere together. Specific examples of adhesives include 100 percent solids adhesives including polyurethane adhesives obtained from Lord Corporation, Erie, Pa., such as TYCEL® 7924 (viscosity from about 1,400 to about 2,000 cps), TYCEL® 7975 (viscosity from about 1,200 to about 1,600 cps) and TYCEL® 7276. The viscosity range of the adhesives is, for example, from about 1,200 to about 2,000 cps. The solventless adhesives can be activated with either heat, room temperature curing, moisture curing, ultraviolet radiation, infrared radiation, electron beam curing, or any other known technique. The thickness of the adhesive layer is usually less than about 100 nanometers, and more specifically, as illustrated hereinafter.

The thickness of each layer of the intermediate transfer members can vary, and is not limited to any specific value. In specific embodiments, the supporting substrate layer thickness is, for example, from about 20 to about 300 microns, from about 30 to about 200 microns, from about 75 to about 150 microns, or from about 50 to about 100 microns, while the thickness of the top core shell component layer is, for example, from about 1 to about 150 microns, from about 10 to about 100 microns, from about 20 to about 70 microns, and from about 30 to about 50 microns. The adhesive layer thickness is, for example, from about 1 to about 100 nanometers, from about 5 to about 75 nanometers, or from about 50 to about 100 nanometers.

The surface resistivity of the intermediate transfer members disclosed herein is, for example, from about $10^8$ to about $10^{13}$ ohm/sq, or from about $10^{10}$ to about $10^{12}$ ohm/sq. The sheet resistivity of the intermediate transfer members is, for example, from about $10^8$ to about $10^{13}$ ohm/sq, or from about $10^{10}$ to about $10^{12}$ ohm/sq.

The intermediate transfer members illustrated herein, like intermediate transfer belts, can be selected for a number of printing and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image apparatus is a color xerographic copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc.

The layer or layers may be deposited on the substrate via well known coating processes. Known methods for forming the core shell layer on the substrate film are dipping, spraying such as by multiple spray applications of very thin films, casting, flow-coating, web-coating, roll-coating, extrusion, molding, or the like can be used.

The intermediate transfer members disclosed herein can be of any suitable configuration. Examples of suitable configurations include a sheet, a film, a web, a foil, a strip, a coil, a cylinder, a drum, an endless strip, a circular disc, a belt including an endless belt, and an endless seamed flexible belt. The circumference of the belt configuration for 1 to 2, or more layers is, for example, from about 250 to about 2,500 millimeters, from about 1,500 to about 2,500 millimeters, or from about 2,000 to about 2,200 millimeters. The width of the film or belt is, for example, from about 100 to about 1,000 millimeters, from about 200 to about 500 millimeters, or from about 300 to about 400 millimeters. The intermediate transfer member can be comprised of a single layer, or it can be comprised of several layers, such as from about 2 to about 5 layers. In embodiments, the intermediate transfer member further includes an outer release layer.

Release layer examples include TEFLON®-like materials including fluorinated ethylene propylene copolymer (FEP), polytetrafluoroethylene (PTFE), polyfluoroalkoxy polytetrafluoroethylene (PFA TEFLON®, and other TEFLON®-like materials; silicone materials, such as fluorosilicones, and silicone rubbers, such as Silicone Rubber 552, available from Sampson Coatings, Richmond, Va., (polydimethyl siloxane/dibutyl tin diacetate, 0.45 gram DBTDA per 100 grams of polydimethyl siloxane rubber mixture with molecular weight of approximately 3,500); and fluoroelastomers, such as those sold under the trade name VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomer can be those available from E.I. DuPont such as 4-bromoperfluorobutene-1,1,1-dihydro-4-bromoperfluorobutene-1,3-bromo perfluoropropene-1,1,1-dihydro-3-bromoperfluoro propene-1, or any other suitable known commercially available cure site monomer.

Specific embodiments will now be described in detail. These examples are intended to be illustrative, and the disclosure is not limited to the materials, conditions, or process parameters set forth in these embodiments. All parts are percentages by weight of total solids unless otherwise indicated.

COMPARATIVE EXAMPLE 1

An intermediate transfer belt (ITB) member comprised of the polyaniline (PANI) was prepared as follows. One gram of PANIPOL® F, a hydrochloric acid doped emeraldine salt obtained from Panipol Oy (Porvoo Finland), was mixed with 9 grams of MAKROLON® 5705, a known polycarbonate resin having a $M_w$ molecular weight average of from about 50,000 to about 100,000, commercially available from Farbenfabriken Bayer A.G., and 100 grams of methylene chloride. By ball milling this mixture with 2 millimeter stainless shot overnight, or 23 hours, a uniform dispersion was obtained.

The above formed dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, the film on the PEN substrate was automatically released from the substrate resulting in a 75 micron thick intermediate transfer member of a polyaniline/polycarbonate shell with a ratio by weight of 10/90, where the polyaniline is dispersed in the polycarbonate.

EXAMPLE I

An intermediate transfer belt (ITB) member comprised of the disclosed polyaniline POSS core shell component formed from the reaction of a polyaniline and trisilanol phenyl POSS was prepared as follows. 0.95 Grams of PANIPOL® F, a hydrochloric acid doped emeraldine salt obtained from Panipol Oy (Porvoo Finland), was mixed with 0.05 gram of trisilanolphenyl-POSS (SO1458, obtained from Hybrid Plastics), 9 grams of MAKROLON® 5705, a known polycarbonate resin having a $M_w$ molecular weight average of from about 50,000 to about 100,000, commercially available from Farbenfabriken Bayer A.G., and 100 grams of methylene chloride. By ball milling this mixture with 2 millimeter stainless shot overnight, or 23 hours, a uniform dispersion was obtained, where the polyaniline POSS core shell was formed in situ via strong acid base interaction.

The dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, about 23° C. to about 25° C., the film on the PEN substrate was automatically released from the substrate resulting in a 75 micron thick intermediate transfer member of a polyaniline POSS core shell component/polycarbonate with a ratio by weight of 10/90, and where the core shell component comprised 5 weight percent of the POSS shell and 95 weight percent of the polyaniline core.

EXAMPLE II

An intermediate transfer belt (ITB) member comprised of the disclosed polyaniline POSS core shell component was prepared as follows. 0.90 Gram of PANIPOL® F, a hydrochloric acid doped emeraldine salt obtained from Panipol Oy (Porvoo Finland), was mixed with 0.10 gram of trisilanolphenyl-POSS (SO1458, obtained from Hybrid Plastics), 9 grams of MAKROLON® 5705, a known polycarbonate resin having a $M_w$ molecular weight average of from about 50,000 to about 100,000, commercially available from Farbenfabriken Bayer A.G., and 100 grams of methylene chloride. By ball milling this mixture with 2 millimeter stainless shot overnight, 23 hours, a uniform dispersion was obtained, where the polyaniline POSS core shell was formed in situ via the strong acid base interaction.

The above formed dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, about 23° C. to about 25° C., the film on the PEN substrate was automatically released from the substrate resulting in a 75 micron thick intermediate transfer member of polyaniline POSS core shell component/polycarbonate with a ratio by weight of 10/90 (10 core shell/90 polycarbonate), and where the core shell component comprised 10 weight percent of the POSS shell and 90 weight percent of the polyaniline core.

Surface Resistivity Measurement

The above ITB members or devices of Comparative Example 1, and Examples I and II were measured after one day for surface resistivity (averaging four to six measurements at varying spots, 72° F./65 percent room humidity) using a High Resistivity Meter (Hiresta-Up MCP-HT450 from Mitsubishi Chemical Corp.). Then the ITB devices of Comparative Example 1, and Example II were acclimated in an environment of 80° F./80 percent humidity (A zone) for an aging study, and the surface resistivity was measured again after 12 weeks. The results are provided in Table 1.

TABLE 1

| | Surface Resistivity After 1 Day (ohm/sq) | Surface Resistivity After 12 weeks (ohm/sq) |
|---|---|---|
| Comparative Example 1 | $2.8 \times 10^9$ | $2.6 \times 10^8$ |
| Example I | $3.5 \times 10^9$ | N.A. |
| Example II | $4.3 \times 10^9$ | $1.3 \times 10^9$ |

The polyaniline POSS core shell component ITB devices (Examples I and II) possessed similar surface resistivity as the Comparative Example 1 polyaniline ITB device at day 1. After 12 weeks aging at 72° F./65 percent room humidity, the controlled ITB device (Comparative Example 1) was about 1.02 orders of magnitude less resistive; the disclosed ITB device (Examples II) was about 0.53 orders of magnitude less resistive. Thus, the disclosed Example II ITB device exhibited substantially less change in resistivity with accelerated aging in 72° F./65 percent room humidity primarily because of its excellent water repelling characteristics.

Contact Angle Measurement

The contact angles of water (in deionized water) of the ITB devices of Comparative Example 1 and Examples I and II were measured at ambient temperature (about 23° C.), using the Contact Angle System OCA (Dataphysics Instruments GmbH, model OCA15. At least ten measurements were performed, and their averages are reported in Table 2.

TABLE 2

| | Contact Angle |
|---|---|
| Comparative Example 1 | 45° |
| Example I | 86° |
| Example II | 91° |

The disclosed Example I and Example II ITB devices exhibited a 41° to 46° higher contact angles than the Comparable Example 1 ITB device, which higher angles (lower surface energy) will result in improved toner transfer and cleaning by about 45 percent for Example I and 50 percent for Example II.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting essentially of a core shell component, and wherein the core is comprised of a polyaniline, and the shell is comprised of polyhedral silsesquioxane, and wherein said core shell component is formed by reacting said polyaniline with a polyhedral silsesquioxane silanol.

2. An intermediate transfer member in accordance with claim 1 wherein said shell is hydrophobic and said member further includes a supporting layer in contact with said core shell.

3. An intermediate transfer member in accordance with claim 1 wherein said polyhedral silsesquioxane is represented by POSS $RSiO_{1.5}$, where R is at least one of alkyl with from about 1 to about 18 carbon atoms, and aryl with from about 6 to about 36 carbon atoms, and wherein POSS is a polyhedral silsesquioxane.

4. An intermediate transfer member in accordance with claim 3 wherein alkyl contains from about 4 to about 8 carbon atoms, and aryl contains from about 6 to about 18 carbon atoms.

5. An intermediate transfer member in accordance with claim 3 wherein alkyl contains from about 1 to about 6 carbon atoms, and aryl contains from 6 to about 12 carbon atoms.

6. An intermediate transfer member in accordance with claim 1 wherein said polyhedral silsesquioxane silanol is isobutyl-polyhedral oligomeric silsesquioxane cyclohexenyldimethylsilyldisilanol ($C_{38}H_{84}O_{12}Si_8$), cyclopentyl-POSS dimethylphenyidisilanol ($C_{43}H_{76}O_{12}Si_8$), cyclohexyl-POSS dimethylvinyldisilanol ($C_{46}H_{88}O_{12}Si_8$), cyclopentyl-POSS dimethylvinyldisilanol ($C_{39}H_{74}O_{12}Si_8$), isobutyl-POSS dimethylvinyidisilanol ($C_{32}H_{74}O_{12}Si_8$), cyclopentyl-POSS disilanol ($C_{40}H_{74}O_{13}Si_8$), isobutyl-POSS disilanol ($C_{32}H_{74}O_{13}Si_8$), isobutyl-POSS epoxycyclohexyldisilanol ($C_{38}H_{84}O_{13}Si_8$), cyclopentyl-POSS fluoro(3)disilanol ($C_{40}H_{75}F_3O_{12}Si_8$), cyclopentyl-POSS fluoro(13)disilanol ($C_{45}H_{75}F_{13}O_{12}Si_8$), isobutyl-POSS fluoro(13)disilanol ($C_{38}H_{75}F_{13}O_{12}Si_8$), cyclohexyl-POSS methacryldisilanol ($C_{51}H_{96}O_{14}Si_8$), cyclopentyl-POSS methacryldisilanol ($C_{44}H_{82}O_{14}Si_8$), isobutyl-POSS methacryldisilanol ($C_{37}H_{82}O_{14}Si_8$), cyclohexyl-POSS monosilanol ($C_{42}H_{78}O_{13}Si_8$), cyclopentyl-POSS monosilanol (Schwabinol, $C_{35}H_{64}O_{13}Si_8$), isobutyl-POSS monosilanol ($C_{28}H_{64}O_{13}Si_8$), cyclohexyl-POSS norbornenylethyldisilanol ($C_{53}H_{98}O_{12}Si_8$), cyclopentyl-POSS norbornenylethyldisilanol ($C_{46}H_{84}O_{12}Si_8$), isobutyl-POSS norbornenylethyldisilanol ($C_{39}H_{84}O_{12}Si_8$), cyclohexyl-POSS disilanol ($C_{45}H_{88}O_{12}Si_8$), isobutyl-POSS disilanol ($C_{31}H_{74}O_{12}Si_8$), cyclohexyl-POSS trisilanol ($C_{42}H_{80}O_{12}Si_7$), cyclopentyl-POSS trisilanol ($C_{35}H_{66}O_{12}Si_7$), isobutyl-POSS trisilanol ($C_{28}H_{66}O_{12}Si_7$), isooctyl-POSS trisilanol ($C_{56}H_{122}O_{12}Si_7$), phenyl-POSS trisilanol ($C_{42}H_{38}O_{12}Si_7$), and mixtures thereof, and wherein POSS is a polyhedral silsesquioxane.

7. An intermediate transfer member in accordance with claim 1 wherein said polyhedral silsesquioxane silanol is represented by

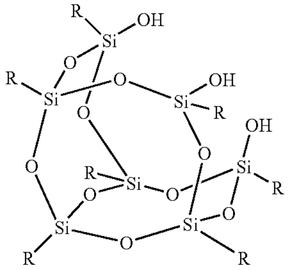

wherein each R is isooctyl, isobutyl, or phenyl.

8. An intermediate transfer member in accordance with claim 1 wherein said core shell component possesses a particle size diameter of from about 0.1 to about 10 microns.

9. An intermediate transfer member in accordance with claim 8 wherein said core shell component possesses a particle size diameter of from about 1 to about 5 microns.

10. An intermediate transfer member in accordance with claim 1 wherein said core shell component is present in an amount of from about 1 to about 70 percent by weight based on the weight of total solids.

11. An intermediate transfer member in accordance with claim 1 wherein said core shell component is present in an amount of from about 5 to about 20 percent by weight based on the weight of total solids.

12. An intermediate transfer member in accordance with claim 1 wherein said polyaniline is poly(p-phenyleneimineamine).

13. An intermediate transfer member in accordance with claim 3 wherein said polyhedral oligomeric silsesquioxane is an oligomer, and wherein R is alkyl.

14. An intermediate transfer member in accordance with claim 3 wherein said polyhedral oligomeric silsesquioxane is an oligomer, and wherein R is aryl.

15. An intermediate transfer member in accordance with claim 13 wherein said alkyl contains from about 1 to about 18 carbon atoms, and said core shell is of a diameter of from about 0.5 to about 3 microns.

16. An intermediate transfer member in accordance with claim 1 further including a conductive component of at least one of a carbon black, a metal oxide, a polyaniline, and mixtures thereof, each present in an amount of from about 1 to about 60 percent by weight based on the weight of total solids.

17. An intermediate transfer member in accordance with claim 1 wherein said member has a surface resistivity of from about $10^8$ to about $10^{13}$ ohm/sq.

18. An intermediate transfer member in accordance with claim 17 wherein said surface resistivity is from about $10^{10}$ to about $10^{12}$ ohm/sq.

19. An intermediate transfer member in accordance with claim 1 wherein said intermediate transfer member has a circumference of from about 250 to about 2,500 millimeters.

20. A hydrophobic intermediate transfer member consisting of a polyaniline core, and a shell generated from the reaction of said polyaniline with isobutyl-polyhedral oligomeric silsesquioxane cyclohexenyldimethylsilyldisilanol ($C_{38}H_{84}O_{12}Si_8$), cyclopentyl-POSS dimethylphenyldisilanol ($C_{43}H_{76}O_{12}Si_8$), cyclohexyl-POSS dimethylvinyldisilanol ($C_{46}H_{88}O_{12}Si_8$), cyclopentyl-POSS dimethylvinyldisilanol ($C_{39}H_{74}O_{12}Si_8$), isobutyl-POSS dimethylvinyldisilanol ($C_{32}H_{74}O_{12}Si_8$), cyclopentyl-POSS disilanol ($C_{40}H_{74}O_{13}Si_8$), isobutyl-POSS disilanol ($C_{32}H_{74}O_{13}Si_8$), isobutyl-POSS epoxycyclohexyldisilanol ($C_{38}H_{84}O_{13}Si_8$), cyclopentyl-POSS fluoro(3)disilanol ($C_{40}H_{75}F_3O_{12}Si_8$), cyclopentyl-POSS fluoro(13)disilanol ($C_{45}H_{75}F_{13}O_{12}Si_8$), isobutyl-POSS fluoro(13)disilanol ($C_{38}H_{75}F_{13}O_{12}Si_8$), cyclohexyl-POSS methacryldisilanol ($C_{51}H_{96}O_{14}Si_8$), cyclopentyl-POSS methacryldisilanol ($C_{44}H_{82}O_{14}Si_8$), isobutyl-POSS methacryldisilanol ($C_{37}H_{82}O_{14}Si_8$), cyclohexyl-POSS monosilanol ($C_{42}H_{78}O_{13}Si_8$), cyclopentyl-POSS monosilanol (Schwabinol, $C_{35}H_{64}O_{13}Si_8$), isobutyl-POSS monosilanol ($C_{28}H_{64}O_{13}Si_8$), cyclohexyl-POSS norbornenylethyldisilanol ($C_{53}H_{98}O_{12}Si_8$), cyclopentyl-POSS norbornenylethyl disilanol ($C_{46}H_{84}O_{12}Si_8$), isobutyl-POSS norbornenylethyldisilanol ($C_{39}H_{84}O_{12}Si_8$), cyclohexyl-POSS TMS disilanol ($C_{45}H_{88}O_{12}Si_8$), isobutyl-POSS TMS disilanol ($C_{31}H_{74}O_{12}Si_8$), cyclohexyl-POSS trisilanol ($C_{42}H_{80}O_{12}Si_7$), cyclopentyl-POSS trisilanol ($C_{35}H_{66}O_{12}Si_7$), isobutyl-POSS trisilanol ($C_{28}H_{66}O_{12}Si_7$), isooctyl-POSS trisilanol ($C_{56}H_{122}O_{12}Si_7$), or phenyl-POSS trisilanol ($C_{42}H_{38}O_{12}Si_7$), and wherein POSS is a polyhedral silsesquioxane.

21. An intermediate transfer member in accordance with claim 1 wherein said polyhedral silsesquioxane is represented by

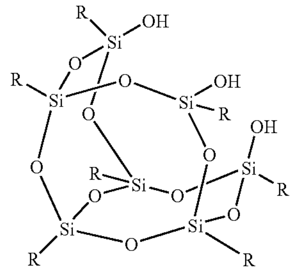

wherein each R is alkyl, aryl, or mixtures thereof.

22. An intermediate transfer member in accordance with claim 1 wherein said core is present in an amount of from about 50 to about 99 weight percent, and said shell is present in an amount of from about 1 to about 50 weight percent of based on the weight percent of said core shell component.

23. An intermediate transfer member in accordance with claim 1 wherein said core is present in an amount of from about 70 to about 90 weight percent, and said shell is present in an amount of from about 10 to about 30 weight percent, and wherein the total thereof is about 100 percent.

24. An intermediate transfer member in accordance with claim 1 wherein said core shell is dispersed in a polymer selected from the group consisting of polyimide, polycarbonate, polyester, polyvinylidene fluoride, polysulfone, polyetherimide, polyamideimide, polyamide, polyethylene-co-polytetrafluoroethylene, and mixtures thereof.

25. An intermediate transfer member in accordance with claim 1 further comprising an outer release layer positioned on said core shell.

26. An intermediate transfer member in accordance with claim 25 wherein said release layer comprises a fluorinated ethylene propylene copolymer, a polytetrafluoroethylene, a polyfluoroalkoxy polytetrafluoroethylene, a fluorosilicone, a polymer of a vinylidenefluoride, hexafluoropropylene, and tetrafluoroethylene, or mixtures thereof.

27. An intermediate transfer member consisting essentially of a supporting substrate and a coating of a core shell component consisting essentially of a polyaniline core and thereover polyhedral silsesquioxane, wherein said core is present in an amount of from about 45 to about 99 weight percent, and said shell is present in an amount of from about 1 weight percent to about 55 weight percent, wherein said polyhedral silsesquioxane is represented by POSS $RSiO_{1.5}$, where R is at least one of alkyl and aryl and wherein POSS is a polyhedral silsesquioxane, and wherein said core shell component is formed by reacting said polyaniline with a polyhedral silsesquioxane silanol.

28. An intermediate transfer member in accordance with claim 27 further including a polymer wherein the ratio of said core shell to said polymer is from about 5/95 to about 10/90.

29. An intermediate transfer member in accordance with claim 27 wherein said alkyl contains from about 1 to about 18 carbon atoms, and said aryl contains from about 6 to about 36 carbon atoms.

* * * * *